United States Patent [19]
Kato et al.

[11] Patent Number: 5,737,467
[45] Date of Patent: Apr. 7, 1998

[54] RESIN MOLDED OPTICAL ASSEMBLY

[75] Inventors: Takeshi Kato, Akishima; Shinji Tsuji, Hidaka; Kimio Tatsuno, Tokyo; Satoru Kikuchi, Kokubunji; Masahiro Ojima, Tokyo; Yoichi Yasuda, Komoro, all of Japan

[73] Assignee: Hitachi, Ltd., Tokyo, Japan

[21] Appl. No.: 569,915

[22] Filed: Dec. 8, 1995

[30] Foreign Application Priority Data

Dec. 13, 1994 [JP] Japan .................................. 6-308635

[51] Int. Cl.⁶ .................................................... G02B 6/36
[52] U.S. Cl. ............................ 385/92; 385/93; 385/78; 385/94
[58] Field of Search .............................. 385/92, 72, 78, 385/60, 88–91, 93, 94, 14, 49

[56] References Cited

U.S. PATENT DOCUMENTS

| | | | |
|---|---|---|---|
| 4,904,036 | 2/1990 | Blonder | 385/14 |
| 5,371,822 | 12/1994 | Horwitz et al. | 385/88 X |
| 5,420,953 | 5/1995 | Boudreau et al. | 385/49 X |

OTHER PUBLICATIONS

"Technology Research Report of Electronic Information Communication Institute" (vol. 1, 96, No. 196, pp. 13 to 18) Yamauchi et al. no date.

"Proceedings of 6 International Workshop on Optical Access Networks" (pp. S3.4–1 to S3.4–8) Oct. 21, 1986 Kurata et al.

Primary Examiner—Phan T. H. Palmer
Attorney, Agent, or Firm—Antonelli, Terry, Stout, & Kraus, LLP

[57] ABSTRACT

An optical fiber is held in a ferrule, and then the ferrule is located in a positioning groove formed in a substrate, thereby aligning the optical fiber with an optical device bonded to a surface of the substrate. Then, a lid is placed on the substrate in such a manner that the ferrule is located in a positioning groove formed in the lid and that the optical device is received in a cavity formed in the lid. The ferrule is thus held between the two grooves, and in this condition a resin is filled in the two grooves, thereby retaining the ferrule. Then, the lid is sealingly secured to the substrate. After these parts are thus assembled together, this assembly is put in dies, and then a package is molded.

23 Claims, 8 Drawing Sheets

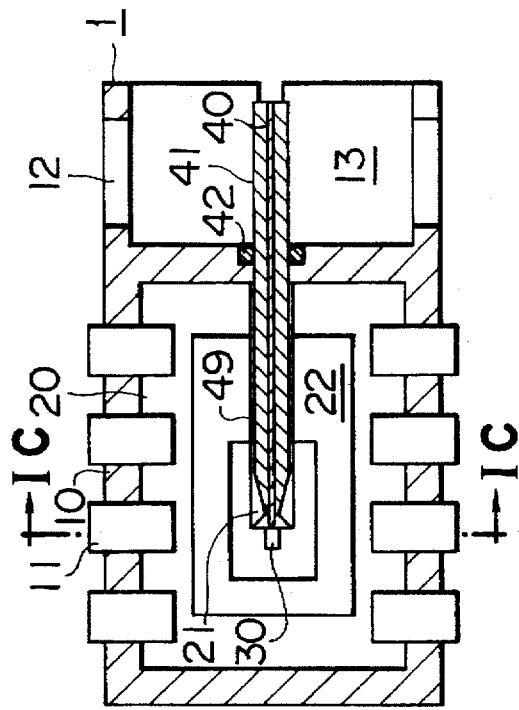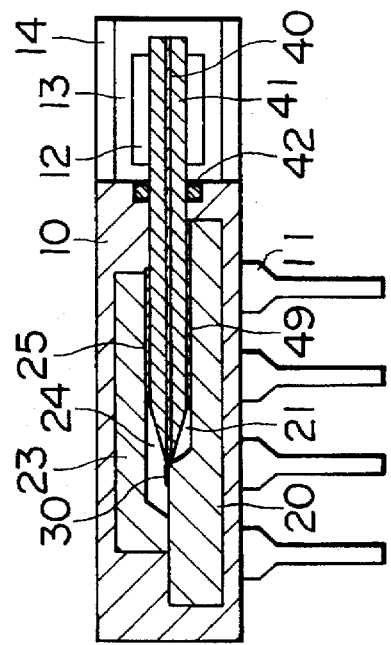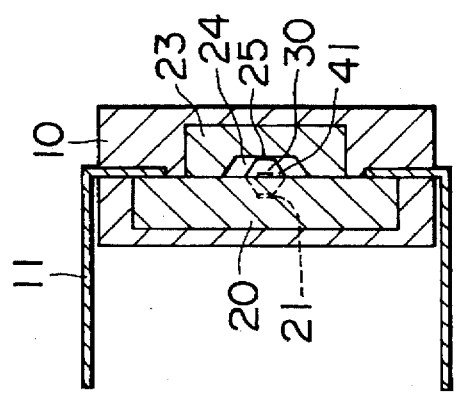

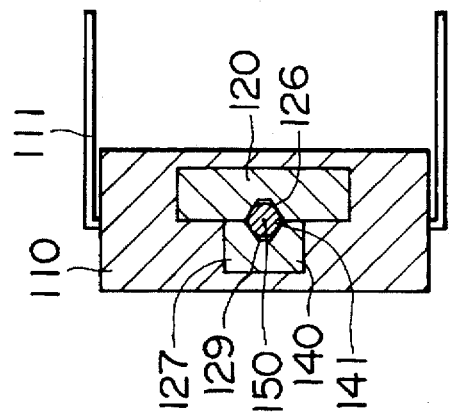
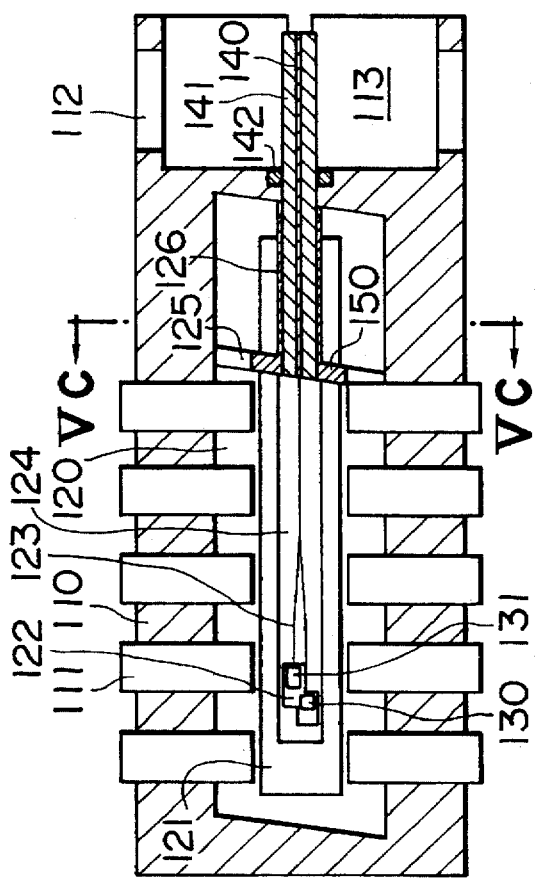
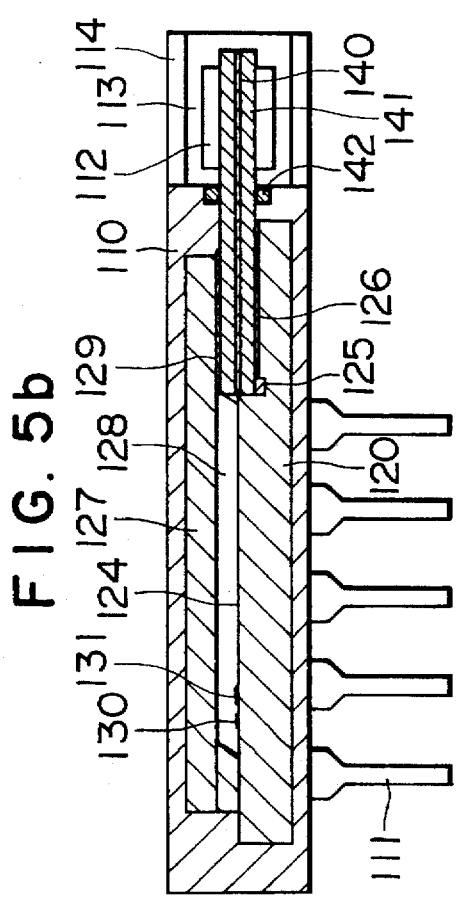

RESIN MOLDED OPTICAL ASSEMBLY

BACKGROUND OF THE INVENTION

This invention relates generally to an optical assembly for coupling an optical device and an optical fiber together, and more particularly to passive alignment suited for reducing mounting cost.

Recently, with the spread of optical communication networks intended for subscribers, there has been a strong demand for a low-cost, compact optical assembly.

In order to reduce the number of component parts of an optical assembly, attention has now been directed to a butt-coupling method and a lens-ended fiber coupling method, instead of a simple lens coupling method and a multi-lens coupling method, in the coupling between an optical device and an optical fiber.

In the alignment of the optical device with the fiber, a passive alignment method (in which the assembling is mechanically effected without emission of light from the optical device) has been widely used, instead of an active alignment method (in which the assembling is effected by finding the optimum position while emitting light from the optical device), since the former method can be automated more easily.

In the connection of the fiber to the optical assembly, it is preferred that a package itself should be provided with a receptacle for an optical fiber connector in order to eliminate the handling of a pigtailed fiber which prevents the automation.

In order to automate the mounting of the optical assembly onto a printed circuit board, the package type has now been shifting from the can type to the surface mount type.

In an attempt to meet the above-mentioned requirements, there has been proposed an optical assembly disclosed in "Technology Research Report of Electronic Information Communication Institute" (Vol. 1, 96, No. 196, pages 13 to 18) and "Proceedings of 6 International Workshop on Optical Access Networks" (pages S3.4-1 to S3.4-8).

The structure of the optical assembly described in the above literature is shown in FIGS. 7a to 7c. As shown in FIGS. 7a to 7c, this optical assembly comprises, as main components, a laser diode 801, a glass ferrule 805 to which a short fiber 804 is beforehand fixedly secured, a silicon substrate 802 having a V-like cross-sectional (hereinafter referred to merely as "V-shaped") groove formed therein, a surface mount-type ceramic package 803 having a slit formed in its side wall, and a lid 808. In an assembling process, the laser 801 and the substrate 802 are first aligned with each other through image recognition of indexes formed thereon, and then the laser 801 is bonded to the substrate 802. Then, the substrate 802 is fixedly mounted within the package 803.

Next, that portion of the fiber 804 projecting from the ferrule 805 is passed through slit 807, is placed on the V-shaped groove, and is held in this V-shaped groove by a holder plate, and then is fixed by resin. Thus, the fiber 804 is precisely positioned by the V-shaped groove, and is connected to the laser 801. The ferrule 805 is fixedly secured to a base outside a package cavity to constitute a receptacle 806.

Finally, the lid 808 is put on the package 803, and is sealingly secured thereto by resin 809. A gap between the fiber 804 and the slit 807 is filled with the resin 809. For electrical shielding, the lid 808 is further soldered to the package base.

An optical assembly 800 thus assembled is mounted on a printed circuit board, and a connector plug 810 of a fiber cable is connected to this assembly as shown in FIG. 7b. The plug 810 comprises a split sleeve 811 for aligning the plug 810 with the ferrule 805 of the optical assembly 800, a spring 812 for urging the ferrule 805 into press-contact with the plug, and a clip 813 for fastening the plug 810 and the receptacle 806 together.

In order to further reduce the cost of the optical assembly, it is necessary to eliminate some of the constituent parts or to simplify the construction of these parts. Although the achievement of low-cost and compact design is desired, care must be taken so that the optical assembly can be sufficiently reliably operated in environments in which it is used.

In the optical assembly disclosed in the above-mentioned literature, the ceramic package is used for the purpose of taking out leads and of achieving the hermetic sealing. Generally, although a ceramic package is more reliable regarding thermal stress, thermal resistance, moisture resistance and so on than a plastic package, its manufacturing cost is high since a lamination process, a sintering process and so on are required. Therefore, it has been thought that the low-cost design is limited to the above conventional technique.

In regard to the reliability of the above-mentioned optical assembly, a bare fiber portion is exposed at the area between the slit in the side wall of the package and the ferrule. It is thought that stresses due to the difference in thermal expansion between the package and the fiber, as well as stresses caused by the attachment and detachment of the plug to and from the receptacle, concentrate on the bare fiber portion which is the weakest portion. These stresses also act on the resin filled in the gap between the fiber and the slit. Therefore, in the above-mentioned conventional technique, no measures have been taken for eliminating the possibility of rupture of the fiber and for enhancing the reliability and durability of the hermetic seal. Thus, the conventional optical assembly is not sufficiently satisfactory in view of the cost and reliability.

SUMMARY OF THE INVENTION

This invention seeks to provide an optical assembly of a simple mounting construction which achieves both low cost and high reliability.

More specifically, a first object of the present invention is to provide an optical assembly including an optical device and an optical fiber, in which the fiber can be positively protected and can be highly precisely positioned, and the optical device can be sealed without the use of a ceramics package, thereby providing optical assembly at a low cost.

A second object is to provide a sealing material which can be conveniently used.

A third object is to provide a ferrule which can be handled easily.

A fourth object is to provide means for effecting passive alignment in a direction of the optical axis of the fiber.

A fifth object is to provide a ferrule which enables an easy connection of a fiber connector.

A sixth object is to provide means by which the optical device and the fiber are disposed close to each other.

A seventh object is to provide means by which reflection at an end face of the fiber is reduced.

An eighth object is to provide means which reduces connection loss with respect to a fiber connector.

A ninth object is to provide a ferrule which holds the fiber firmly with a high degree of accuracy.

A tenth object is to provide means for processing a substrate highly precisely and easily.

An eleventh object is to provide a substrate suited for reduced reflection.

A twelfth object is to provide means for easily fabricating such a substrate.

A thirteenth object is to provide means for processing a lid highly precisely and easily.

A fourteenth object is to provide an optical device which can be easily aligned.

A fifteenth object is to provide means for enhancing the precision of alignment in the direction of height.

A sixteenth object is to provide means for mounting an optical device on a substrate precisely.

A seventeenth object is to provide an optical assembly at a low cost, which enables leads to be easily projected outwardly from a package, which ensures a sufficient environmental resistance, and which enables an easy connection of a fiber connector plug.

An eighteenth object is to provide a ferrule which enables an easy connection of a plug.

A nineteenth object is to provide means which effects heat radiation and mechanical supporting.

A twentieth object is to provide means which enables easy connection and disconnection of a connector.

A twenty-first object is to provide a plug housing at a low cost.

To achieve the first object, there is provided an optical assembly comprising an optical device, an optical fiber, a ferrule having the optical fiber mounted therein, a substrate having a groove, and a lid having a groove and a cavity. The lid is placed on the substrate in such a manner that the ferrule is held between the two grooves, thereby properly positioning the ferrule. The optical device, bonded to the substrate, is received in the cavity, and the lid is sealingly secured to the substrate.

To achieve the second object, the substrate, the lid and the ferrule are fixedly secured together by thermoplastic or thermosetting resin.

To achieve the third object, the ferrule and the optical fiber are substantially equal in length to each other.

To achieve the fourth object, one end of the ferrule is held against an inner end surface of the groove in the substrate.

To achieve the fifth object, one end portion of the ferrule is projected from an edge of the substrate.

To achieve the sixth object, one end portion of the ferrule is tapered.

To achieve the seventh object, one end face of the ferrule is formed into an oblique surface.

To achieve the eighth object, one end face of the ferrule is polished into a curved surface.

To achieve the ninth object, the ferrule comprises a ceramic pipe or a glass pipe.

To achieve the tenth object, the substrate is made of a (100) silicon crystal, and the groove in the substrate is defined by a (100) crystal surface and a (111) crystal surface.

To achieve the eleventh object, another groove is formed obliquely in the substrate.

To achieve the twelfth object, the substrate is cut in parallel to the two grooves.

To achieve the thirteenth object, the lid made of a (100) silicon crystal is formed with a groove and cavity which are defined by a (100) surface and a (111) surface.

To achieve the fourteenth object, the optical device comprises an edge emitting laser diode or an edge detection photodiode.

To achieve the fifteenth object, the optical device comprises a semiconductor, and is die-bonded to the substrate in a junction-down manner.

To achieve the sixteenth object, an optical waveguide is monolithically formed in the substrate.

To achieve the seventeenth object, the substrate and the lid, hermetically sealed together, are further packaged, and a receptacle for a fiber connector is formed by a the package and part of a ferrule in part.

To achieve the eighteenth object, the package is molded of resin.

To achieve the nineteenth object, leads larger in number than the number of electrodes of the active optical device are projected outward from the package.

To achieve the twentieth object, a plug of the fiber connector also includes a ferrule, and an alignment sleeve, a spring and a latch are provided in either the plug or the receptacle.

To achieve the twenty-first object, the ferrule, the sleeve and the spring are housed in a reinmolded housing of the plug, and the latch is constituted by part of the housing.

In the above-mentioned first measures, the optical device is mounted at a predetermined portion on the substrate, and the ferrule is passively aligned by the two grooves. Therefore, the optical device and the fiber can be coupled together easily and accurately. The optical device and the ferrule are sealed by the substrate and the lid, and therefore there is no need to use an expensive ceramic package for sealing purposes as in the conventional construction, and the size of the optical assembly will not unduly be increased by the package. The fiber is firmly and precisely protected by the ferrule outside the sealing portion and the cavity, and therefore in contrast with the conventional construction, stresses will not locally concentrate on the bare fiber, and rupture of the fiber as well as leakage of the hermetic structure is prevented. Therefore, there can be provided an optical assembly which is low in cost, and is reliable.

In the second means, before the lid is placed on the substrate, the resin is coated, or after the lid is placed on the substrate, the resin is applied to the lid and areas around the ferrule, and then heat and pressure are applied in order to easily effect the hermetic sealing. The necessity of metallization of the bonding surface and the control of the atmosphere can be eliminated since soldering is not required for sealing.

In the third measures, the fiber is not projected outwardly from the ferrule, and hence it is protected, and therefore, troubles such as breakage or soiling of the fiber as in a conventional construction are prevented from occurring during handling of the ferrule with the use of automated assembly device, and thus the handling is easy, and the yield will not be lowered.

In the fourth measures, the ferrule is abutted against the groove in the substrate, thereby effecting passive alignment in the direction of the optical axis of the fiber. In the conventional construction, the fiber itself is abutted against the groove, so that the fiber has often been chipped at its end face or broken intermediate opposite ends thereof. In the present invention, such troubles will not be encountered.

In the fifth measures, the fiber connector is attached to the firm ferrule projecting from the substrate, and therefore the fiber will not be damaged or broken during this step so that the fiber connector can be easily connected.

In the sixth measures, the side surface of the groove against which the ferrule abuts is inclined, and the distance between the optical device and the fiber is adjusted by the tapering construction. This distance depends on the narrowest portion of the tapered portion; that is, the diameter of the end face of the ferrule. Without such a tapering construction, the fiber can not be brought close to the optical device because of the presence of the above-mentioned inclined surface. With this arrangement, the distance between the optical device and the fiber can be made optimum, thereby reducing the connection loss.

In the seventh means, the end face of the fiber, as well as the end face of the ferrule, is formed into an oblique surface. Reflection light from the end face deviates from the optical axis, so that the reflection of the light toward the optical device is reduced. Therefore, the degrading of characteristics of the optical device, as well as the generation of noise, is prevented, and also erroneous operation is prevented.

In the eighth measures, the fibers each polished at the end face into a curved surface are connected together through physical contact. A reflection loss as produced by a flat end face is not encountered, so that the connection loss can be reduced.

In the ninth measures, the ferrule is formed by processing (e.g. grinding or drawing) a ceramic material or a glass material. By suitably controlling the inner diameter of the through hole (into which the fiber is inserted) and the outer diameter of the ferrule, the rigidity can be made higher than that obtained with metal, and therefore the ferrule of the above materials is suited for rigid positioning, and even if the connector is connected and disconnected repeatedly, the ferrule will not be deformed and worn. The thermal expansion coefficient of the above materials is approximately equal to that of the fiber, and therefore thermal stresses are prevented from being exerted upon the fiber, and therefore the connection of the fiber can be kept stable over a long period of time.

In the tenth measures, the silicon substrate is subjected to anisotropic etching, using an aqueous solution of potassium hydroxide. By doing so, the groove defined by the (111) crystal surface and the (100) crystal surface can be formed extremely precisely. With this method, a batch process is possible, and the cost of forming the groove is lower as compared with machining. As compared with a V-shaped groove formed only by the (111) crystal surfaces, the gap between the ferrule and the groove is small, and therefore, hermetic sealing can be achieved more easily. This reduces the cost and the connection loss.

In the eleventh measures, the end face of the ferrule is formed into an oblique surface having the same oblique angle as that of the oblique groove, and this end face is held against the side surfaces of the oblique groove. With this arrangement, reflection is suppressed, and the distance between the optical device and the fiber can be reduced, thereby reducing the connection loss.

In the twelfth measures, before the substrates are formed from a wafer by dicing, the oblique grooves are formed in the wafer at one time, and therefore it is possible to enhance the through-put. Should substrates of a rectangular shape be cut from a wafer, the oblique groove should be formed in each of the substrates, and the time and cost for this processing are increased.

In the thirteenth measures, the grooves and the cavities defined by the (111) crystal surface and the (100) crystal surface can be formed at the same time by applying anisotropic etching to the silicon crystal. If the lid and the substrate are both made of silicon, thermal stresses are prevented from being exerted upon the sealed portion so that the connection loss and the cost can be reduced.

In the fourteenth measures, the optical axis of the optical device is aligned with the optical axis of the fiber, and there is no need to use any extra part (e.g. a mirror and a prism) for perpendicularly polarizing an optical path as in a surface light-emitting type or a surface detection type. Therefore, the number of the component parts is reduced.

In the fifteenth measures, the distance or height from the junction to the surface closely near thereto can be sufficiently controlled by a crystal growth process and an electrode formation process. Namely, with this junction-down bonding, unevenness in the height of the optical device can be suppressed. Should the optical device be mounted in a junction-up manner, the connection loss should increase because of unevenness in the height.

In the sixteenth measures, there can be formed the groove aligned, relative to the position of the optical waveguide monolithically formed in the substrate. In this case, the connection loss due to a positional deviation is less in comparison with the case where a separate optical waveguide is mounted on the substrate.

In the seventeenth measures, the substrate and the lid are sealingly Joined together, and further these are protected from the outside environment by the package. Further, the connection of the leads to the substrate is reinforced. The optical assembly can be automatically mounted on a printed circuit board, and thereafter the fiber connector can be connected to this assembly. Therefore, the reliability is enhanced, and the cost can be reduced. Furthermore, it is possible to prevent handling of pigtailed fibers which have hindered the automation of mounting.

In the eighteenth measures, the plastic package molded from resin is inexpensive in comparison with a ceramic package. Since the ferrule projects outwardly from the package, the insertion of the plug can be effected easily. Therefore, the cost can be reduced.

In the nineteenth measures, heat transfers from the optical device to the printed circuit board via the electrode leads and the dummy leads. Forces, produced when attaching and detaching the connector, are received by these leads. When operating the high-speed optical device, the dummy leads are used for strengthing a power source or the ground. Namely, heat radiating characteristics, durability and anti-noise characteristics are enhanced.

In the twentieth measures, the two ferrules, provided respectively in the receptacle and the plug, are inserted in the sleeve to be aligned with each other, and are butted against each other by the spring. When the latch is released, the plug can be removed from the receptacle. Namely, the plug can be connected to the receptacle by push-on operation, and therefore the connector can be handled easily.

In the twenty-first measures, the sleeve, the ferrule and the spring are sequentially mounted in the plastic housing, and the plug is assembled by molding a resin. The latch is molded simultaneously with the molding of the housing. With this construction, the cost can be reduced.

BRIEF DESCRIPTION OF THE DRAWINGS

FIGS. 1a to 1c are cross-sectional views illustrating an optical module assembly in a first embodiment of the present invention;

FIGS. 5a to 5c are cross-sectional views of an optical module assembly in a second embodiment of the invention;

DESCRIPTION OF THE PREFERRED EMBODIMENTS

Figure 2C:
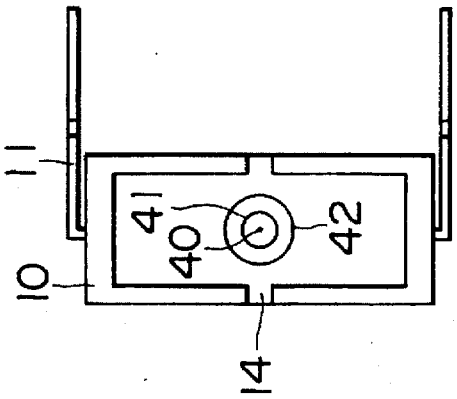
FIGS. 2a to 2c are respectively a plan view, a side-elevational view, an end view of the optical module assembly.
Figure 2A:
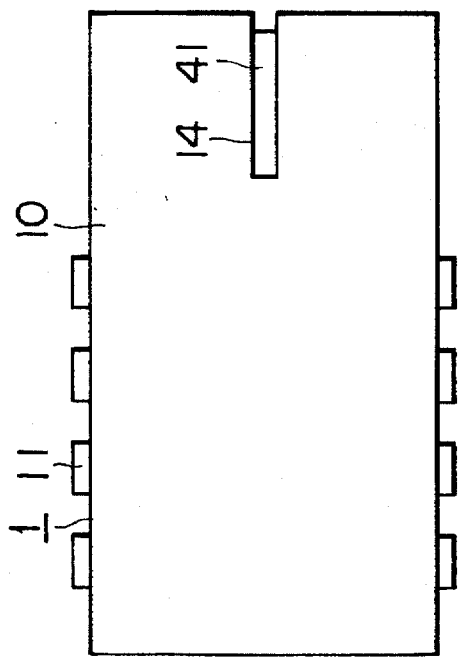
Figure 2B:
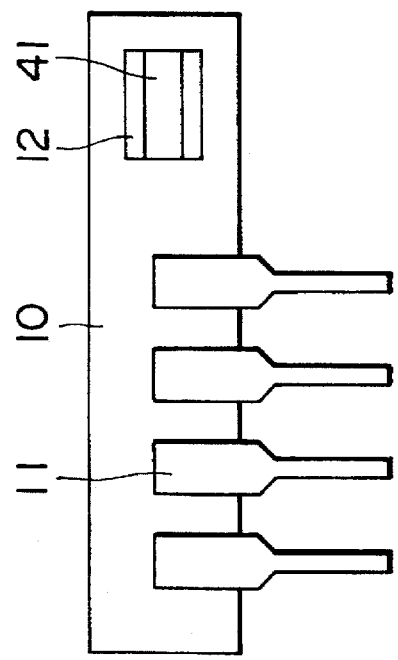

A preferred embodiment of the present invention will now be described with reference to the drawings.

In FIGS. 1a to 2c, the optical module assembly 1 broadly comprises an optical device 30, an optical fiber 40, a ferrule 41, a substrate 20, a lid 23, a package 10, and a receptacle 13.

The optical device 30 is coupled to the fiber 40. The fiber 40 is held by the ferrule 41. The substrate 20 has a groove 21 for positioning the ferrule 41, and the optical device 30 is bonded to the substrate 20. The lid 23 has a groove 25 for positioning the ferrule 41, and a cavity 24 for receiving the optical device 30, and this lid 23 is sealingly secured to the substrate 20. The package 10 includes the substrate 20, the lid 23 and the ferrule 41, and leads 11 extend outwardly from the package 10. The receptacle 13 is constituted by a part of the package 10 and a part of the ferrule 41, and the optical plug assembly 2 (see FIGS. 3 and 4) is connected to this receptacle 13.

The optical device 30 comprises an edge light-emitting laser diode of InP semiconductor material with an oscillation wavelength of 1.3 µm. Here, the chip size thereof is 0.6 mm in length, 0.4 mm in width and 0.1 mm in height (The length is taken in the direction of the optical axis). In order that the optical device 30 can be butt-joined to the fiber 40 with a spot size of 5 µm, the spot size of the optical device 30 is enlarged to about 3 µm. The optical device 30 is die-bonded to a predetermined portion of the substrate 20 in a junction-down manner. The distance or height of an active layer of the optical device 30 from the surface of the substrate 20 is about 6 µm.

The fiber 40 is formed of a single-mode fiber having a diameter of 125 µm and a length of about 12 mm. The fiber 40 is inserted into a through hole or bore (having a diameter of 126 µm) of the ferrule 41, and is fixed thereto. The ferrule 41 is formed of a glass pipe having a diameter of 1.000 mm, and the length of the ferrule 41 is equal to the length of the fiber 40. One end portion of the ferrule 41 is tapered at an angle of about 30 degrees, and the diameter of this end face is 200 µm. The other end is projected from an edge of the substrate 20, and PC (physical contact) polishing has been applied to this end face of the ferrule 41. A ring 42 having a diameter of 1.9 mm is caulked to the ferrule 41, and prevents a force from being exerted to the substrate 20 and the lid 23 when the optical plug assembly 2 is connected to the optical module assembly 1.

The substrate 20 is formed of a (100) silicon crystal having a length of 11 mm, a width of 7.5 mm and a height of 1.5 mm. Wiring for connecting the optical device 20 to the leads 11 is formed on the surface of the substrate 20. The groove 21 is formed by anisotropic etching using a solution of KOH with a tolerance or precision of within ±0.5 µm, and each side surface of the groove 21 is defined by a (111) crystal surface, whereas the bottom surface thereof is defined by a (100) crystal surface. The groove 21 has a width of 1.2 mm and a depth of 0.6 mm. The inner end of the ferrule 41 is held in contact with the (111) surface at the inner end of the groove 21. In this case, the distance between the end face of the ferrule 41 and the optical device 30 is about 20 µm.

The lid 23 is formed of a (100) silicon crystal having a length of 8 mm, a width of 4.5 mm and a height of 1.5 mm. The groove 25 and the cavity 24 are formed by anisotropic etching as described above for the groove 21. The groove 25 is generally equal in width and depth to the groove 21, and the cavity 24 is equal in depth to the groove 25. The lid 23 is fixedly secured by thermoplastic resin 49 to the substrate 20 at a sealing area 22. The resin 49 is filled in a gap between the groove 21 and the ferrule 41 and in a gap between the groove 25 and the ferrule 41, thereby forming a hermetic seal.

The package 10 has a length of 17.5 mm, a width of 9.5 mm and a height of 4.0 mm. The substrate 20, the lid 23, the ferrule 41 and the leads 11 are beforehand assembled together, and this assembly is put into dies, and then the package 10 is formed by transfer molding. The ferrule 41 is projected into the receptacle 13, and latch windows 12 and key grooves 14 are formed in the receptacle 13. The pitches of the leads 11 are 100 mil, and the intervals of the leads 11 in the direction of the width are 400 mil. Two of the eight leads 11 are for electrodes of the optical device 30, and the other six are dummy leads for heat radiation, mechanical supporting, and grounding purposes.

In an automatic mounting process for the optical module assembly 1, the optical device 30 is first bonded to the substrate 20. Indexes are preformed in those surfaces of the optical device 30 and substrate 20 which are to face each other, and passive alignment is carried out while recognizing images of these indexes through an infrared microscope, and the optical device is fixedly secured to the substrate 20 by AuSn soldering. It was confirmed that an alignment precision of within ±0.3 µm could be obtained. Another passive alignment method was also performed, in which self alignment was effected making use of a surface tension of a solder bump, in which case it was confirmed that the alignment precision was almost equal to that obtained with the first-mentioned passive alignment method. Electrodes of the optical device 30 opposite to the soldered portion are wire-bonded to the wiring on the substrate 20.

Then, the resin 49 is beforehand coated onto those portions of the substrate 20 or the lid 23 corresponding to the sealing area 22 and also onto those portions to which the leads 11 are to be fixedly secured. The ferrule 41 is mounted in the groove 21, and the inner end of the ferrule 41 is abutted against the inner end of the groove 21. Then, the lid 23 is put on the substrate 20 to cover the inner end portion of the ferrule 41. Then, a lead frame is put on the substrate 20. The lid 23 and the lead frame are fixedly secured to the substrate 20 by heating while pressing them against the substrate. Simultaneously with the sealing, the ferrule 41 is properly positioned by the grooves 21 and 25.

Finally, the package 10 is transfer molded. The assembly hermetically sealed is placed in the dies, and a molten resin is poured into a mold cavity, and is cured or set. Then, the molded product is removed from the dies, and the lead frame is shaped to provide the leads 11. In this manner, the optical module assembly 1 is completed.

Figure 3A:
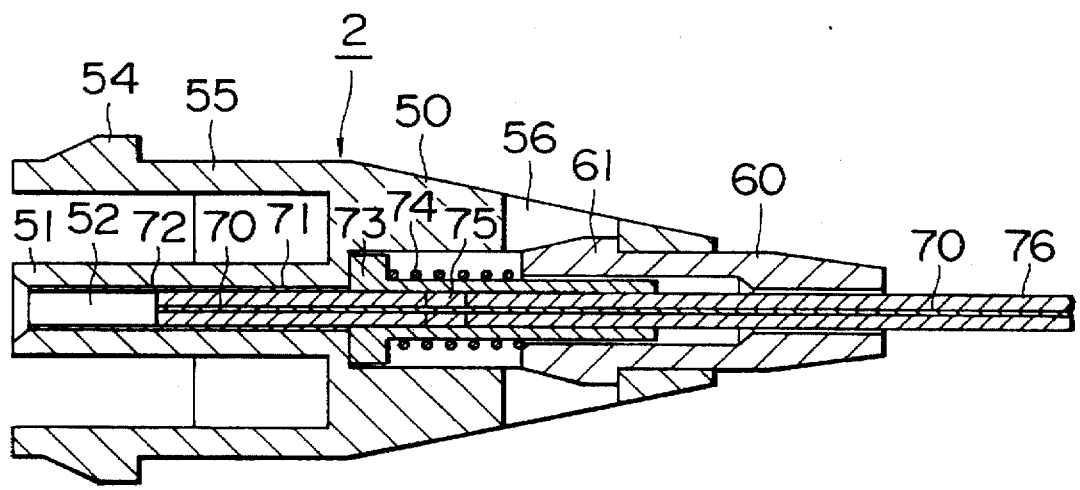
FIGS. 3a and 3b are cross-sectional views illustrating an optical plug assembly in the first embodiment of the invention.
Figure 3B:
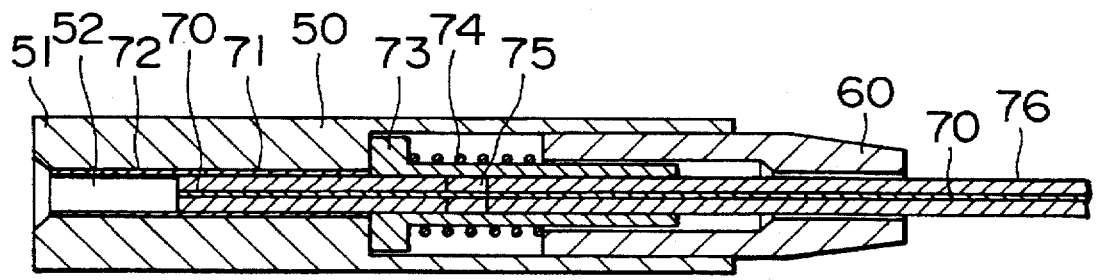
Figure 4A:
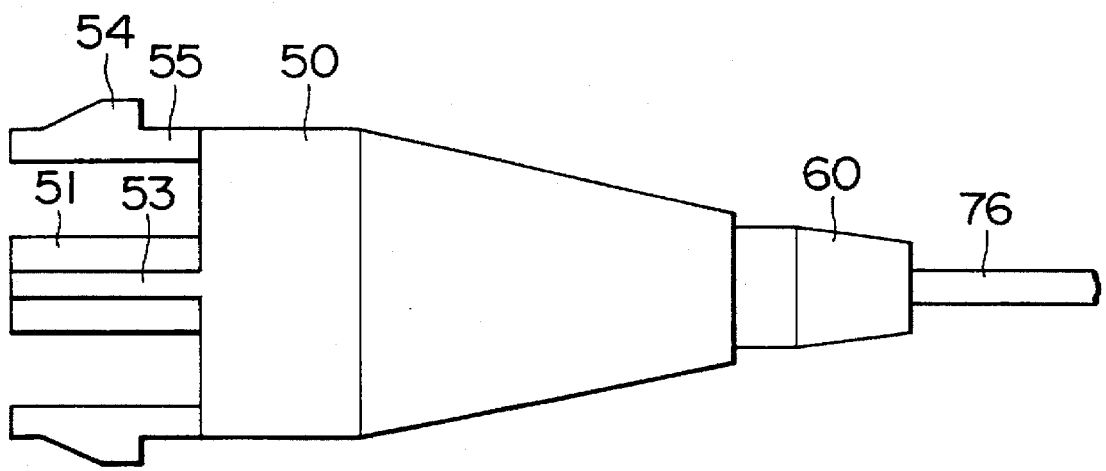
FIGS. 4a and 4b are respectively a plan view and a side-elevational view illustrating the optical plug assembly.
Figure 4B:
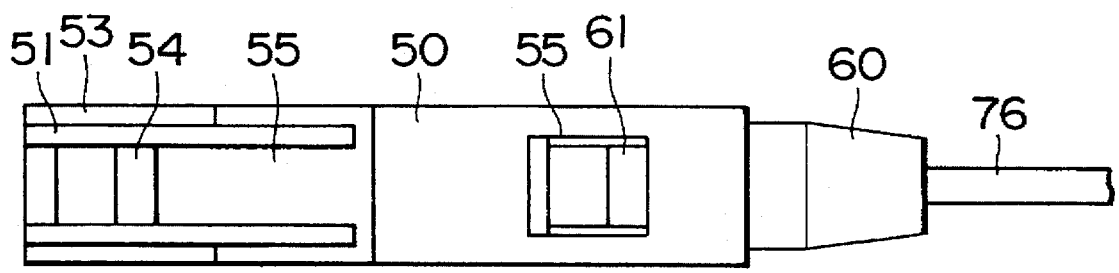

The optical plug assembly 2 for connection to this optical module assembly 1 is shown in FIGS. 3 and 4.

In FIGS. 3 and 4, the optical plug assembly 2 broadly comprises an optical fiber 70, a ferrule 71, a sleeve 72, a pipe 73, a helical spring 74, a housing 50, a plug 51, and latches 54. The overall size of this assembly 2 is 22.8 mm in length, 9.4 mm in width and 4.0 mm in height.

The fiber 70 is formed of a single-mode fiber having a diameter of 125 μm as described above for the fiber 40. A front or inner end portion of the fiber 70 is fixedly secured to a ferrule 71 and the pipe 73 by resin 75, and that portion of the fiber 70 extending rearward from the resin 75 is covered with a sheath 76. The sheath 76 has diameter of 0.9 mm.

The ferrule 71 is formed of a glass pipe having a diameter of 1.000 mm as described above for the ferrule 41. PC polishing has been applied to an end face of the ferrule 71. The ferrule 71 is inserted in the sleeve 72, and the pipe 73 of metal is fixedly mounted on the ferrule 71. The spring 74 is fitted on the pipe 73, and a boot 60 serves as a stopper for the spring 74. A latch 61 of the boot 60 is mechanically retained by a window 56 in the housing 50.

The sleeve 72 is formed of a pipe made of an elastic material and having a longitudinal slit. The sleeve 72 is received in a bore 52 of the plug 51 formed by part of the housing 50. The housing 50 is formed by transfer molding, and includes the latches 54 for the windows 12, and springs 55 for respectively operating these latches 54.

When the optical plug assembly 2 is to be connected to the optical module assembly 1, keys 53 are inserted respectively into the key grooves 14, and are moved therealong. The ferrule 41 is inserted into the sleeve 72 through an open end of the bore 52. The ferrule 41 and the ferrule 71 are aligned with each other by the sleeve 72. When the latches 54 are engaged in the windows 12, respectively, the ferrule 41 and the ferrule 71 are butted against each other, and the spring 74 is contracted, so that the opposed end faces of the two ferrules 41 and 71 are pressed against each other with a suitable force, thus making physical contact between the two. It has been confirmed that an insertion loss between the optical device 30 and the fiber 70 is 2.5 to 3 dB.

In the optical assembly of this first embodiment, the highly-precise positioning can be achieved by the passive alignment, and the receptacle structure obviates the need for the handling of a pigtailed fiber, and the surface mount-type packaging can be achieved. Therefore, the productivity of the optical assembly is enhanced, and the cost of mounting the optical assembly on a printed circuit board can be reduced.

Further, the positioning and the hermetic sealing are achieved at the same time, using the substrate and the lid made of silicon, which can be formed by batch processing, and therefore the inexpensive plastic package can be used instead of the ceramics package, so that the cost of the optical assembly can be reduced.

Furthermore, the fiber can be handled easily by use of the ferrule, and is prevented from being damaged, and the optical device is sufficiently protected using the sealing, achieved by the substrate and the lid, in combination with the resin molding, and therefore the reliability is greatly enhanced.

FIGS. 5a to 5c show a second embodiment of the present invention, and are cross-sectional views illustrating an optical module assembly.

In FIGS. 5a to 5c, the optical module assembly 3 broadly comprises optical devices 130, 131 and 123, an optical fiber 140, a ferrule 141, a substrate 120, a lid 127, a package 110 and a receptacle 113.

The optical devices 130 and 131 are connected to the optical device 123, and the optical device 123 is connected to the fiber 140. The fiber 140 is held by the ferrule 141. The substrate 120 has a groove 126 for positioning the ferrule 141, and the optical devices 130 and 131 are bonded to the surface of the substrate 120. Further, the optical device 123 is formed on the surface of the substrate 120. The lid 127 has a groove 129 for positioning the ferrule 141, and a cavity 128 for receiving the optical devices 130, 131 and 123, and the lid 127 is sealingly secured to the substrate 120. The package 110 includes the substrate 120, the lid 127 and the ferrule 141, and leads 111 extends outwardly from the package 110. The receptacle 113 is constituted by a part of the package 110 and a part of the ferrule 141, and the optical plug assembly 2 is connected to the receptacle 113 in a manner similar to that described above for the first embodiment.

The optical device 130 is identical with the optical device 30 of the first embodiment. The optical device 131 comprises a InP-type edge detection photodiode (waveguide type) having a wavelength of 1 μm. The chip size thereof is generally 0.4 mm in length, 0.4 mm in width and 0.1 mm in height. The optical devices 130 and 131 are die-bonded to the substrate 120 in a junction-down manner by a passive alignment method while recognizing images of indexes, as described above for the first embodiment.

The fiber 140 is formed of a single-mode fiber having a diameter of 125 μm and a length of about 10 mm. The fiber 140 is fixedly secured to the glass ferrule 141 having a diameter of 1.000 mm. One end face of the ferrule 141 is inclined or oblique at an angle of about 8 degrees so as to reduce reflection light, and PC polishing has been applied to the other end face. A ring 142 is caulked on the ferrule 141.

The substrate 120 is formed of a (100) silicon crystal having a length of 18.7 mm, a width of 5 mm and a height of 1.5 mm. The core (optical device) 123 of a silica-waveguide coupler and a cladding layer 124 are formed on the surface of the substrate 120, and wiring for connecting the optical devices 130 and 131 to the leads 111 is formed on the surface of the substrate 120. It is also considered that a wave merging and branching unit, which is not shown, may be formed on the substrate in addition to the waveguide coupler. The optical devices 130 and 131 are mounted in a pit 122 formed in the cladding layer 124, and the pit 122 has a so-called silicon terrace structure.

The groove 126, formed by anisotropic etching, is defined by a (111) crystal surface and a (100) crystal surface. The groove 126 has a width of 1.2 mm and a depth of 0.6 mm. A groove 125 is formed at the inner end of the groove 126, and is inclined or oblique with an angle of about 8 degrees with respect to the groove 126, the groove 125 having a depth of about 0.8 mm. The oblique end face of the ferrule 141 is held in contact with a side surface of this groove 125, so that the optical waveguide 123 and the fiber 140 are coupled together.

Figure 6:
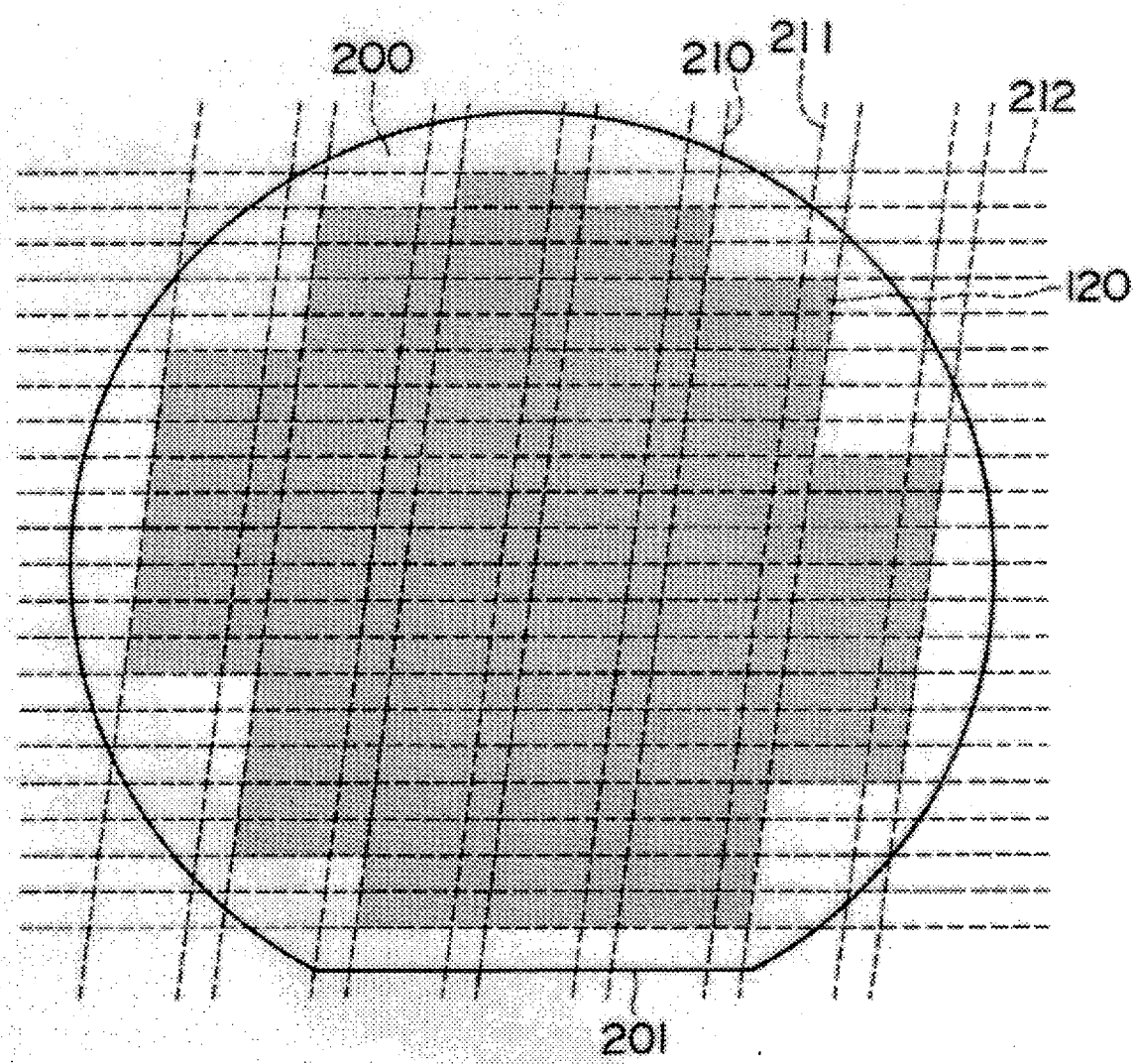
FIG. 6 is a view explanatory of a method of forming a substrate in the second embodiment.
Figure 7A:
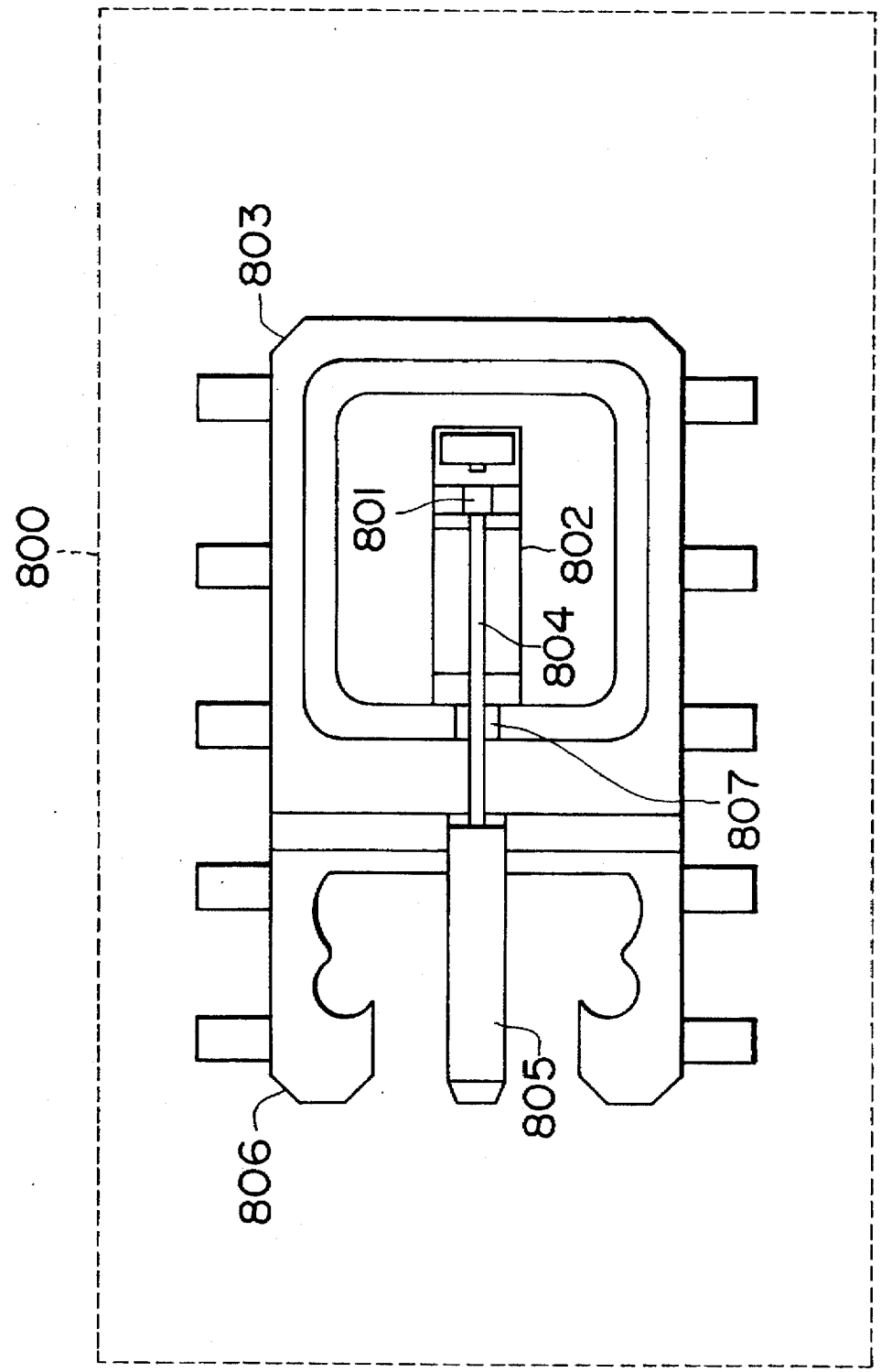
FIGS. 7a to 7c are views showing a conventional optical module assembly and optical plug assembly.
Figure 7B:
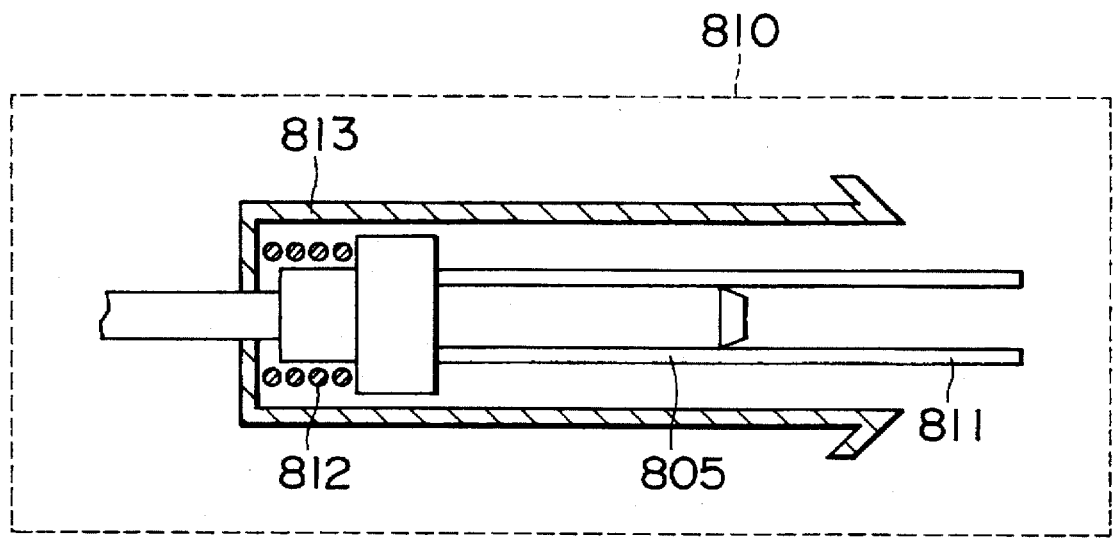
Figure 7C:
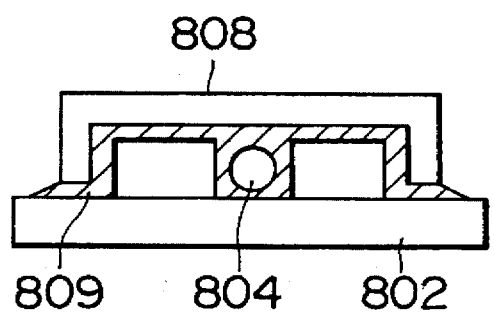

To facilitate the formation of the oblique groove 125, the substrate 120 is formed or cut into a parallelogramic shape. As shown in FIG. 6, the oblique grooves 125 are formed in a surface of a wafer 200 along lines 211 by micro-polishing. Dicing is effected along lines 210 and lines 212 (parallel to an orientation flat 201 in a direction of (110) axis), thereby providing the substrates 120.

The lid 127 comprises a silicon crystal having a length of 16.0 mm, a width of 2.3 mm and a height of 1.5 mm. The groove 129 and the cavity 128 are formed by anisotropic etching similar to the groove 126. The groove 129 is generally equal in size to the groove 126. In a sealing area 121, the lid 127 is fixedly secured to the substrate 120 by thermoplastic resin 150. The ferrule 141 is held between the grooves 126 and 129 to be positioned by them, and gaps between the grooves 125, 126 and 129 and the ferrule 141 are filled with the resin 150, thus forming a hermetic seal.

The package 110 is formed by transfer molding, and has a length of 25.0 mm, a width of 9.5 mm and a height of 4.0 mm. Latch windows 112 and key grooves 114 are formed in the receptacle 113. The pitches of the leads 111 are 100 mil, and the intervals of the leads 111 in the direction of the width are 400 mil.

In the optical assembly of this second embodiment, the mounting can be carried out by an automatic apparatus for a plurality of optical devices or even for optical devices monolithically formed on the substrate in a similar manner as described for the first embodiment, and therefore the productivity and reliability can be enhanced, and further the cost can be reduced.

Further, by applying the oblique arrangement to the fiber and the substrate, the amount of reflection of the light from the fiber end face toward the optical device is reduced, and further the coupling characteristics and the productivity are ensured. In the second embodiment, although only one fiber connecting portion is shown, the ferrule may be formed into a multiple type in the receptacle structure if necessary.

What is claimed is:

1. An optical assembly comprising:
    an optical device;
    an optical fiber coupled to said optical device;
    a ferrule having a through hole in which said optical fiber is held;
    a substrate having a first groove therein, said optical device being bonded to said substrate;
    a lid having a second groove therein adapted to face said first groove for positioning of said ferrule in the first and second grooves, said lid being sealingly secured to said substrate; and
    a package formed of a resin molding and covering said substrate, said lid, and said ferrule, with said ferrule projecting from said package for connection to an optical circuit.

2. An optical assembly according to claim 1, in which said substrate and said lid are secured to each other by thermoplastic or thermosetting resin, and said substrate and at least a part of said ferrule are secured to each other by thermoplastic or thermosetting resin.

3. An optical assembly comprising:
    an optical device;
    an optical fiber coupled to said optical device;
    a first ferrule holding said optical fiber;
    a substrate carrying said optical fiber; and
    a plastic package having said substrate and at least a part of said ferrule are secured therein by a resin;
    wherein said ferrule protects said optical fiber, at least in an area from said substrate to outside of said plastic package.

4. An optical assembly according to claim 3, in which one end of said ferrule close to said optical device is held against an inner end surface of said first groove.

5. An optical assembly according to claim 3, in which one end portion of said ferrule, remote from said optical device, projects from an edge of said package.

6. An optical assembly according to claim 3, in which one end portion of said ferrule close to said optical device, is tapered by an oblique surface inclined with respect to a plane orthogonal to the optical axis of said optical fiber.

7. An optical assembly according to claim 3, in which said ferrule and said optical fiber are substantially equal in length to each other.

8. An optical assembly according to claim 3, in which one end face of said ferrule remote from said optical device is defined by a curved surface.

9. An optical assembly according to claim 3, in which said ferrule is formed of a pipe made of either ceramic or glass.

10. An optical assembly according to claim 3, in which said optical device comprises an optical waveguide formed in a surface of said substrate.

11. An optical assembly according to claim 3, wherein a part of said package and a part of said first ferrule constitute a receptacle for disconnectably connecting therein a plug of an optical fiber connector.

12. An optical assembly according to claim 11, in which said optical device comprises an active device and a number of electrodes, and said package has leads connected to said substrate and of a number larger than the number of said electrodes of said active device.

13. An optical assembly according to claim 11, in which the plug comprises a second optical fiber, and a second ferrule having a through-hole for holding said second optical fiber, one of said plug and said receptacle having a sleeve for aligning said first and second ferrules with each other, a spring for pressing said first and second ferrules into contact with each other, and a latch for locking said plug to said receptacle.

14. An optical assembly according to claim 13, in which said plug includes a housing which houses said second ferrule, said sleeve and said spring, said housing being formed of a resin molding, and in which a part of said housing constitutes said latch.

15. An optical assembly comprising:
    an optical device;
    an optical fiber coupled to said optical device;
    a ferrule holding said optical fiber;
    a substrate having therein a first groove for positioning said ferrule and a cavity for receiving said optical device; and
    a plastic package having said substrate and at least a part of said ferrule secured therein by a resin;
    wherein said substrate is made of a silicon crystal having a (100) crystal surface, and wherein a bottom surface of said first groove is defined by a (100) crystal surface, and side surfaces of said first groove are defined by a (111) crystal surface.

16. An optical assembly according to claim 15, in which said substrate has a second groove therein inclined with respect to a plane perpendicular to an optical axis of said optical fiber.

17. An optical assembly according to claim 15, in which said substrate is in the shape of a parallelogram having two sides that are parallel to said first groove and two other sides that are orthogonal to said first groove.

18. An optical assembly according to claim 15, further comprising a lid, and in which (a) said cavity is formed in said substrate and said lid, (b) said lid has a second groove therein adapted to face the first groove to position said ferrule, (c) said lid is made of a silicon crystal having a (100) crystal surface, (d) a bottom surface of said second groove and a bottom surface of said cavity are defined by a (100) crystal surface, and (e) side surfaces of said second groove and of said cavity are defined by a (111) crystal surface.

19. An optical assembly comprising:

an optical device;

an optical fiber coupled to said optical device;

a ferrule holding said optical fiber;

a substrate having a groove therein for positioning said ferrule, said optical device being bonded to said substrate; and a plastic package having said substrate and at least a part of said ferrule secured therein by a resin;

wherein said optical device is one selected from a group consisting of an edge emitting laser diode and an edge detection photodiode, and wherein said optical device is die-bonded to said substrate in a junction-down manner.

20. An optical assembly according to claim 19, wherein said substrate has a cavity for holding said optical device and part of said optical fiber, and said cavity is covered with the resin.

21. An optical assembly comprising:

an optical device;

an optical fiber coupled to said optical device;

a ferrule holding said optical fiber;

a lid for positioning said ferrule;

a substrate carrying said optical device, one end of said ferrule being fixed on said substrate; wherein said lid and said substrate cooperate to define a cavity having said optical device and at least a part of said optical fiber located therein; and a plastic package having at least said substrate, said lid and said ferrule secured therein by a resin;

wherein said cavity is covered with the resin.

22. An optical assembly comprising:

an optical device;

an optical fiber coupled to said optical device;

a ferrule holding said optical fiber;

a substrate carrying said optical device;

means defining a cavity having therein at least said optical device and a part of said optical fiber; and a plastic package having said substrate and at least a part of said ferrule secured therein by a resin, wherein said cavity is covered with the resin; and wherein said ferrule protects said optical fiber, at least in an area from said substrate to outside of said plastic package.

23. An optical assembly comprising:

an optical device;

an optical fiber coupled to said optical device;

a ferrule holding said optical fiber;

a substrate having a groove for positioning said ferrule, said optical device being bonded to said substrate, and a plastic package having said substrate and at least a part of said ferrule secured therein by a resin;

wherein said ferrule is inserted into said plastic package.

* * * * *